United States Patent [19]

Ritzenthaler

[11] Patent Number: 5,183,162
[45] Date of Patent: Feb. 2, 1993

[54] MOBILE MOUNT SYSTEM

[76] Inventor: Robert Ritzenthaler, 1181 Kempton Park, McKinney, Tex. 75069

[21] Appl. No.: 698,712

[22] Filed: May 10, 1991

[51] Int. Cl.⁵ .............................................. A47F 5/00
[52] U.S. Cl. .................................... 211/1.57; 211/18; 211/94; 211/121; 248/297.1
[58] Field of Search ................... 211/1.57, 18, 19, 94, 211/121, 207; 248/297.1, 299

[56] References Cited

U.S. PATENT DOCUMENTS

| 371,326 | 10/1887 | Jeffery . |
| 557,567 | 4/1896 | Eddy . |
| 577,808 | 2/1897 | Myers . |
| 585,910 | 7/1897 | Crisp et al. . |
| 602,415 | 4/1898 | Moore . |
| 610,656 | 9/1898 | Martin . |
| 614,503 | 11/1898 | Sackett . |
| 618,394 | 1/1899 | Clark . |
| 618,999 | 2/1899 | Sayer . |
| 619,344 | 2/1899 | Pyott, Jr. . |
| 679,794 | 8/1901 | Sweet . |
| 764,744 | 7/1904 | Sargent . |
| 1,435,110 | 11/1922 | Efford . |
| 1,450,051 | 3/1923 | Sickles ............................ 248/297.1 |
| 1,626,539 | 4/1927 | Jones ............................... 248/297.1 |
| 2,172,902 | 9/1938 | Chalk . |
| 2,797,817 | 7/1957 | Shugarman . |
| 3,138,260 | 6/1964 | Tedrick . |
| 3,770,133 | 11/1973 | Kolker ................................ 211/19 |
| 3,883,002 | 5/1975 | Moore . |
| 3,907,113 | 9/1975 | Kropelnitski ....................... 211/19 |
| 3,976,200 | 8/1976 | Munns . |
| 4,136,782 | 1/1979 | Hugel . |
| 4,209,156 | 6/1980 | Kashden . |
| 4,700,845 | 10/1987 | Fretter . |
| 4,749,089 | 6/1988 | Stewart, III . |
| 5,031,085 | 7/1991 | Rustin ......................... 248/297.1 X |
| 5,086,935 | 2/1992 | Gallagher ....................... 211/121 X |

FOREIGN PATENT DOCUMENTS 124980 5/1949 Sweden .................................. 211/19

Primary Examiner—Robert W. Gibson, Jr.
Attorney, Agent, or Firm—Jones, Day, Reavis & Pogue

[57] ABSTRACT

A mount system for a bicycle or other object of similar characteristics is disclosed. A bicycle is secured in a mount that is attached to a motor-driven band within a track. The mounted bicycle is moved along the track when the motor drives the band.

10 Claims, 3 Drawing Sheets

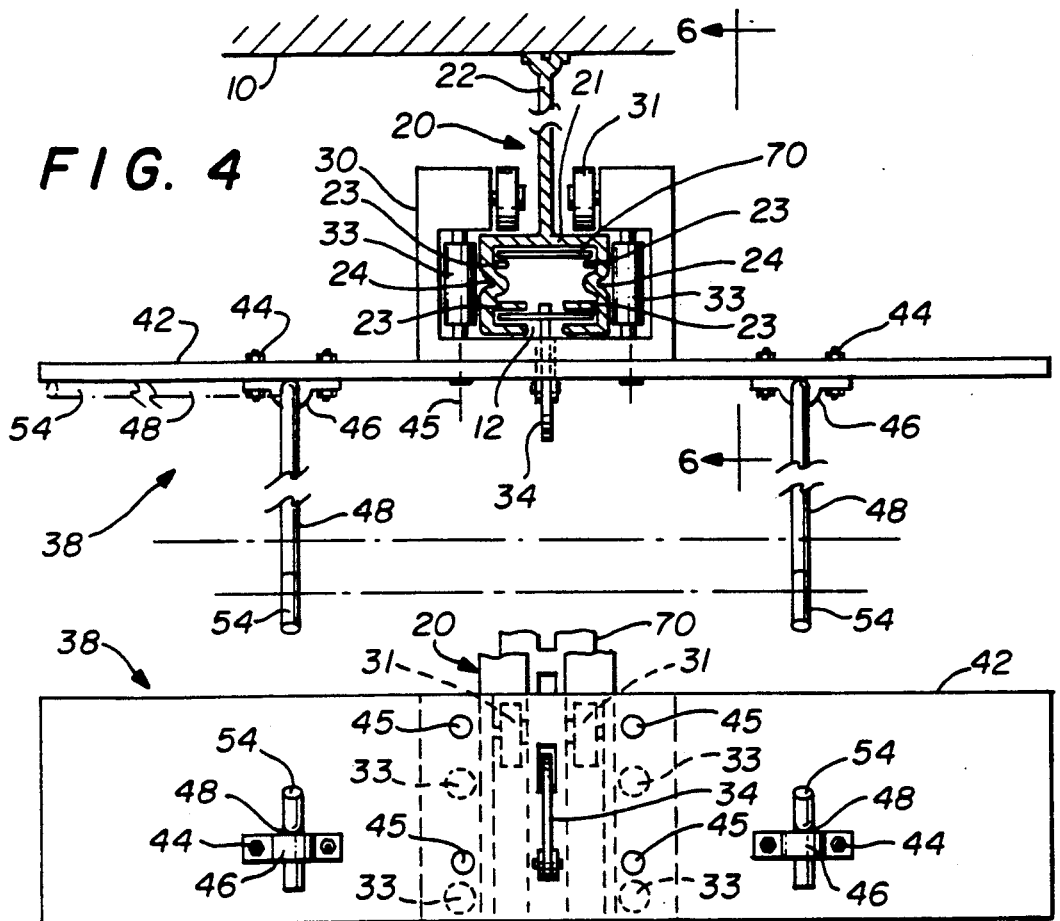
FIG. 4
FIG. 5
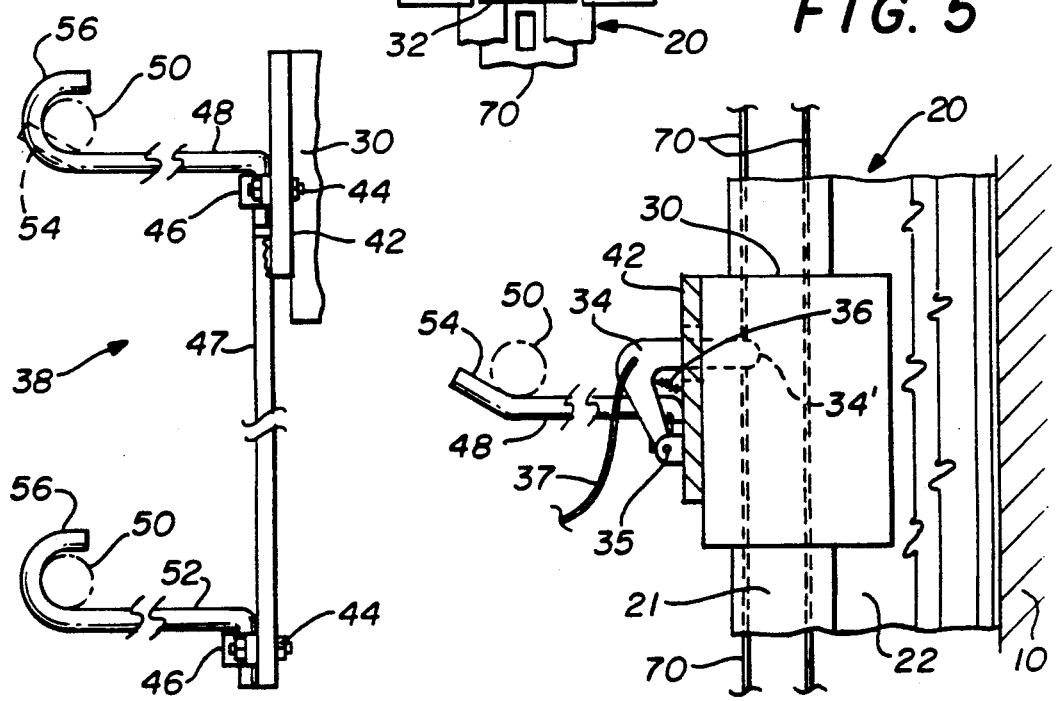
FIG. 3
FIG. 6

MOBILE MOUNT SYSTEM

FIELD OF THE INVENTION

The present invention relates to a mobile mount system. In particular, the invention relates to a system for placing a bicycle or other object on a wall mount when not in use and then elevating the wall mount with the mounted object to a position where it will not interfere with objects or activity below.

BACKGROUND OF THE INVENTION

The storage of bicycles presents peculiar problems and opportunities because a bicycle is relatively long, narrow and lightweight. Bicycles typically are stored by placing the bicycle on a wall mount. The mount often is as simple as two spaced hooks extending from a wall, and the hooks may be specially adapted to receive the horizontal tube of the bicycle frame or the bicycle wheels. Various refinements of bicycle wall mounts are disclosed in U.S. Pat. Nos. 3,883,002 to Moore, 3,976,200 to Munns, 4,136,782 to Hugel, 4,700,845 to Fretter, and 4,749,089 to Stewart, III.

A bicycle wall mount has limited utility, however. A wall mount primarily prevents the bicycle from falling over or being tipped over. It does not particularly protect the bicycle from being damaged by other objects nor remove the bicycle from trafficked areas. In addition, the wall mount itself may be an obstacle when it is not storing a bicycle.

One attempt to improve the utility of a bicycle wall mount is disclosed in U.S. Pat. No. 3,907,133 of Kropelnitski. The Kropelnitski patent discloses a bicycle mount contained on a vertical rail attached to a wall. The mount may be elevated manually by the use of a cable and pulley scheme. The elevated mount is secured by a pin inserted through the mount and rail. The Kropelnitski apparatus elevates the mounted bicycle, but is cumbersome to use.

It is desired, then, to have a bicycle mount that secures a bicycle from harm, positions the bicycle away from trafficked areas, is not an obstacle in itself when not storing a bicycle, and is easy to use.

The present invention comprises such a mount system for a bicycle or other object of similar characteristics. The mount system comprises a mount for securing a bicycle. The mount is preferably releasably coupled to an endless band moving within an elongated enclosed track. In the preferred embodiment, a motor drives the band, thus moving the mount along the track. The track preferably is attached vertically to a wall, and may also continue horizontally on a ceiling. The mount system is used by orienting the mount at a suitable height along the wall. A bicycle is secured in the mount. By operating the motor the mounted bicycle is moved up the wall and then across the ceiling. The motor may be remotely operated. By attaching a plurality of mounts to the band a plurality of bicycles can be sequentially moved along the track and stored. This may be accomplished by enabling the mounts to be releasably coupled to the band so that a mount disengaged on one portion of the track will remain stationary while the band is driven to move a successive bicycle to a location adjacent the first.

By using a counterweight on the endless band to offset the weight of the mount and the bicycle, manual raising and lowering of the bicycle can be accomplished with minimal effort.

SUMMARY OF THE INVENTION

Thus, the present invention relates to a mobile mount system comprising an elongated track attached to a wall, a weight carrying band associated with the track, a mount coupled to the band for receiving an object, the mount being slidably coupled to the track and means engaging the band for enabling selective movement of an object placed on the mount to move the object to a position where it will not interfere with other objects when not in use.

BRIEF DESCRIPTION OF THE DRAWINGS

These and other objects of the present invention will be more fully understood in conjunction with the accompanying drawings in which like numbers indicate like components and in which:

FIG. 3 is a perspective view of a mount and rack of the present invention for securing a bicycle for overhead storage;

FIG. 4 is a top cross-sectional view of the track assembly with the object mount thereon;

FIG. 5 is a front view of the mount and track assembly;

FIG. 6 is a perspective view of a latching assembly;

DESCRIPTION OF THE PREFERRED EMBODIMENT

Figure 1:
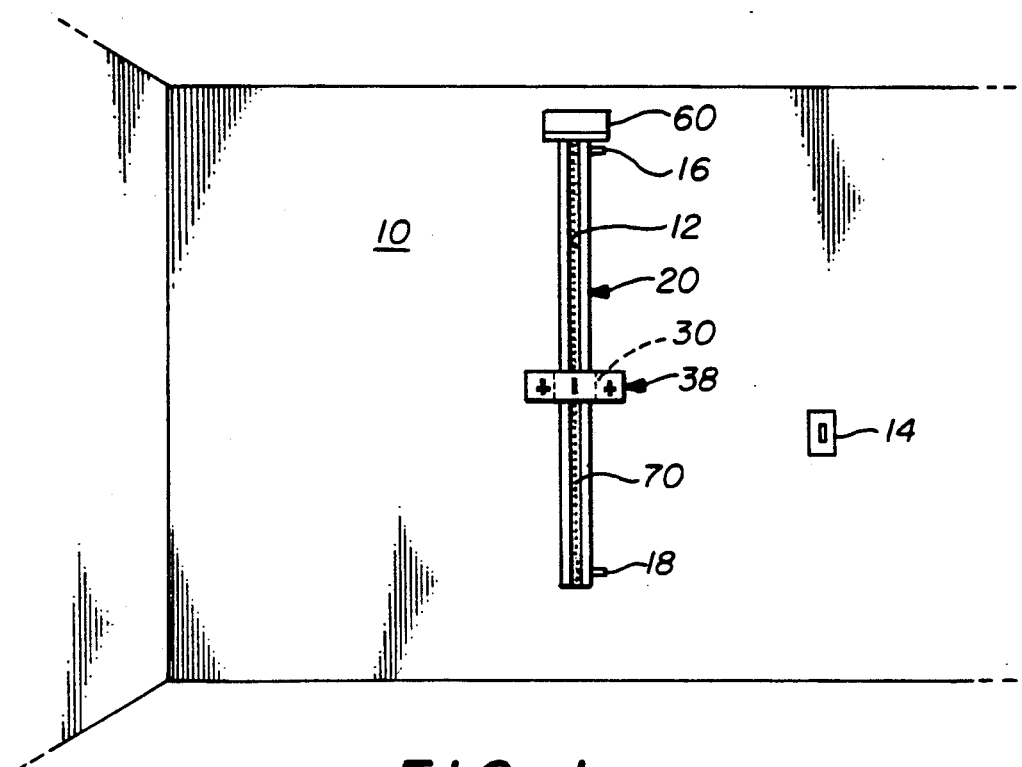
FIG. 1 is a perspective view of one embodiment of the present invention.

FIG. 1 shows the overall assembly of the mobile mount system of the present invention. The system is used in cooperation with wall 10. Wall 10 preferably is an interior wall in a storage room such as a garage, basement or shed. The system could be sufficiently weatherproofed so that wall 10 could be an exterior wall. In general, the system comprises track 20 having channel 12 and being attached to wall 10. Mount 30 is slidably connected to the outside of track 20 and is releasably coupled to continuous loop band 70 within track 20, as shown in greater detail in FIG. 4. Rack 38 is attached to mount 30 for receiving an object such as a bicycle. In the preferred embodiment motor 60 is at one end of track 20, being placed at the top end in FIGS. 1 and 2, and engages band 70. A switch 14, of the conventional push button type, may be used to activate motor 60. Motion activated switches 16 and 18 may be used in the conventional manner to automatically stop motor 60 when mount 30 is in either its uppermost or lowest position.

Figure 2:
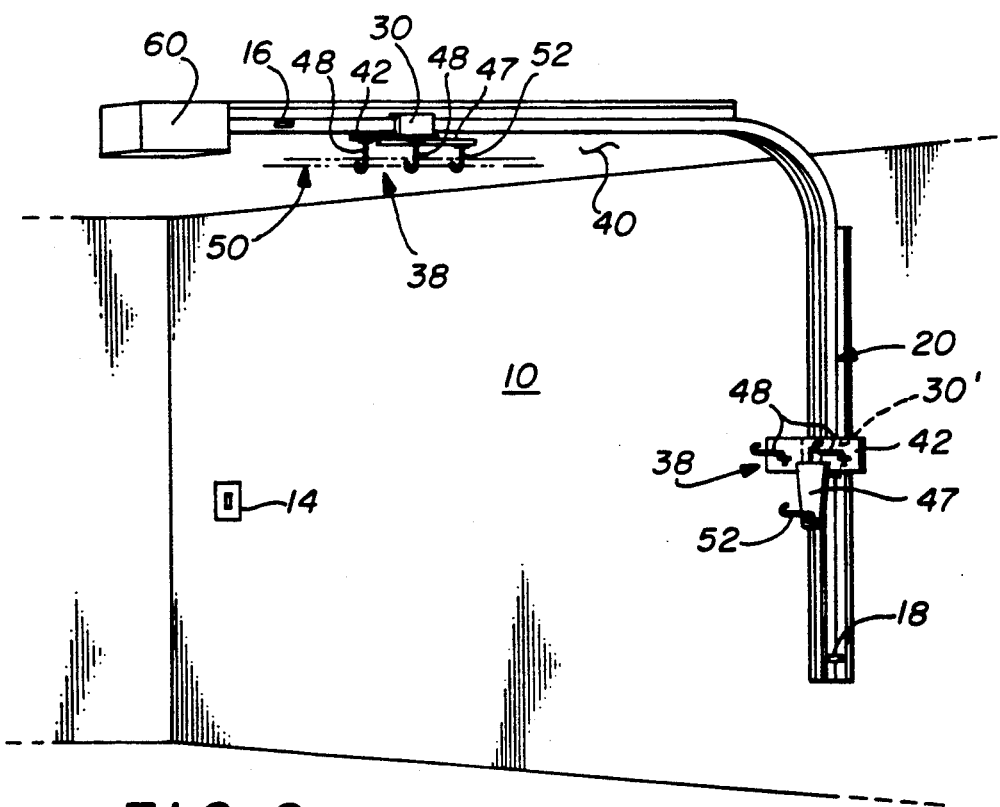
FIG. 2 is a perspective view of an alternate embodiment of the present invention.

FIG. 2 shows an alternate embodiment of the system. In FIG. 2 continuous track 20 is attached vertically to wall 10 and horizontally to ceiling 40, gradually bending in the corner formed between wall 10 and ceiling 40. The embodiment of FIG. 2 allows both ceiling and wall storage of mounted bicycles. FIG. 2 also illustrates tubular members representing a bicycle or other object on mount 30 that is raised to the uppermost storage position by the system. A second mount 30' is shown with rack 38 ready to receive a second bicycle or object to be raised.

FIG. 3 shows the rack assembly 38 of the present invention used to secure a bicycle of typical construction for ceiling storage. Rack 38 includes flat plate 42 that is fastened to moveable mount 30 with bolts or other means 45. A set of upper brackets 46 (only one shown in the side view in FIG. 3) pivotally receives one end of arms 48. A pair of elongated arms or a plate 47 extends downwardly and has a lower bracket 46 attached thereto. Lower bracket 46 pivotally receives one end of arm 52. The distance between arms 48 and 52 is that distance to enable the arms to engage portions of the bicycle frame and/or wheels and hold the same. On vertical wall systems such as shown in FIG. 1, lower arm 52 is unnecessary and the outer end of arms 48 can be bent slightly upward as indicated by phantom lines 54. When used with the system of FIG. 2 to hold the bicycle securely near the ceiling 40, arms 48 and 52 can have their outer ends bent substantially in a semicircle 56 to continue holding the bicycle securely as the bicycle moves from a vertical to a horizontal position. Other types of racks may be used with the embodiment shown in FIG. 1, as the bicycle is moved only vertically and may simply hang from the rack. Arms 48 and 52 are pivotally mounted to plate 42 and extension 47 so they can be folded flat when not in use as shown in FIG. 4.

FIG. 4 is a top view of mount 30 used in the system of FIG. 1 or FIG. 2 and is slidably associated with track 20 and detachably coupled to band 70. FIG. 5 shows a front view of the same assembly. Track 20 comprises channelled section 21 and bracket section 22, the sections being integrally formed with each other. Bracket section 22 is 3 to 5 inches in length and is attached to wall 10 by any of several common methods, such as adhesives, bolts and the like. In cross section, channelled section 21 is a substantially hollow rectangle. An opening 12 is provided in channelled section 21 on the side opposite bracket section 22. The opening 12 runs the length of track 20 as best shown in FIG. 1. Flanges 23 define opposing channels within section 21. Rack 38, instead of being a flat plate as shown in FIGS. 4 and 5, may be U-shaped in cross section with the U laying on its side. The pivotal arms 38 may then be inserted in aligned orifices passing through each leg of the U.

Band 70 is disposed within the opposing channels formed by flanges 23 within channelled section 21 of track 20. Band 70 is a commercially available mechanical drive tape with equally spaced orifices along its length. Band 70 may or may not be a continuous loop that runs the entire length of track 20. However, throughout the remainder of the specification it will be referred to as "continuous". A curved cap element (not shown) is disposed at one end of track 20 so that the band exits one channel in the track, revolves about a sprocket, and enters the opposing channel in the track in a well-known fashion. At the other end of track 20, band 70 engages motor 60. Motor 60 also has a sprocket to engage the orifices in band 70, driving the band through the channels in track 20 also in a well known fashion. Motor 60 is shown in FIGS. 1 and 2 at the top of track 20, although it may be placed at either end of the track. Motor 60 may be controlled by a control switch 14 attached to wall 10 or other convenient location, or by a remote control device. The motor assembly may be part of a commercially available garage door opening system sold by Genie under that mark. The continuous band 70 may be a commercially available mechanical drive tape sold by DuPont under the DYMETROL trademark.

In the embodiment shown in FIGS. 4 and 5, arms 48 are shown pivotally mounted in brackets 46 and can be folded to the side when not in use as illustrated by the phantom lines. The outer end 54 is only slightly curved upwards because the embodiment shown is for use with vertical walls such as shown in FIG. 1. When used with the system of FIG. 2, the embodiment shown in FIG. 3 can be used. Arms 48 are approximately 13 to 15 inches in length to accommodate most bicycles.

In cross section mount 30 is a substantially hollow U-shaped rectangle. Mount 30 is adapted to slide on track 20. Mount 30 has the U opening in the back to receive bracket section 22 of track 20. Clearly, the U-shaped mount 30 could be formed in two sections with an opening between the sections both in front and in back. Bolts 45 would then attach rack 38 to the two sections. Mount 30, as described, is simply representative and any mount that could be coupled to band 70 could be used. Mount 30 can be slid off the bottom end of track 20 to completely remove it from the track 20. Bearings 31 are positioned on opposite sides of the opening in mount 30 near the top of the mount. Bearings 31 are sized and positioned such that they prevent track 20 from contacting the upper inside surface of mount 30 adjacent its opening.

Bearings 31 also reduce friction between mount 30 and track 20 as the mount moves along the track. The weight of the load on mount 30 will tend to pull the mount down and away from wall 10; therefore, the point of greatest potential friction between the mount and track 20 will be at the upper inside surface of the mount on the side nearest the wall—where bearings 31 are placed.

Bottom bearing 32 (FIG. 5) similarly is placed on the lower front side of mount 30 to reduce friction between the mount and track 20. Four side bearings 33 also are placed to reduce friction between the inside surfaces of mount 30 and outside surfaces of track 20. The bearings are attached to mount 30 with pins or rivets in any common manner.

Latch pin 34 detachably connects mount 30 to band 70 within track 20, so that the mount moves as motor 60 moves the band through the channels within the track. In one embodiment latch 34 is simply a pin that is inserted manually into a slot provided in the front side of mount 30 and engages an orifice in band 70. In an alternate embodiment shown in FIG. 6 latch 34 is attached to mount 30 by pin 35 and spring 36. Spring 36 causes a projection 34' on latch 34 to engage an orifice in band 70 in the absence of force applied to cord 37. This alternate embodiment is preferred when track 20 continues onto ceiling 40, as shown in FIG. 2, where a manually inserted latch might fall out and disengage the mount from the track.

The alternate embodiment of FIG. 6 may be used to retain a mounted bicycle in position on the ceiling while moving another mounted bicycle as illustrated in FIG. 2. In this embodiment, a first mounted bicycle 50 may be positioned on the ceiling by operating motor 60 and so moving the bicycle 50 up track 20 onto the horizontal portion of the track. Downward force applied to cord 37 will disengage latch 34 and mount 30 from band 70, allowing motor 60 to be operated to raise or lower another mounted bicycle on second mount 30' without moving the first bicycle 50 as illustrated in FIG. 2.

As shown in FIGS. 4 and 5, rack 38 is fixedly attached to mount 30 for securely holding a bicycle. It will be appreciated that rack 38 may be removably attached to mount 30 by the use of bolts 45 or the like. Removing rack 38 from mount 30 when not in use reduces the likelihood that the rack itself will interfere with other objects or traffic in the storage area. As stated previously, the mount 30 itself may be removed from the track simply by letting it slide off the bottom of track 20.

Figures 7, 8:
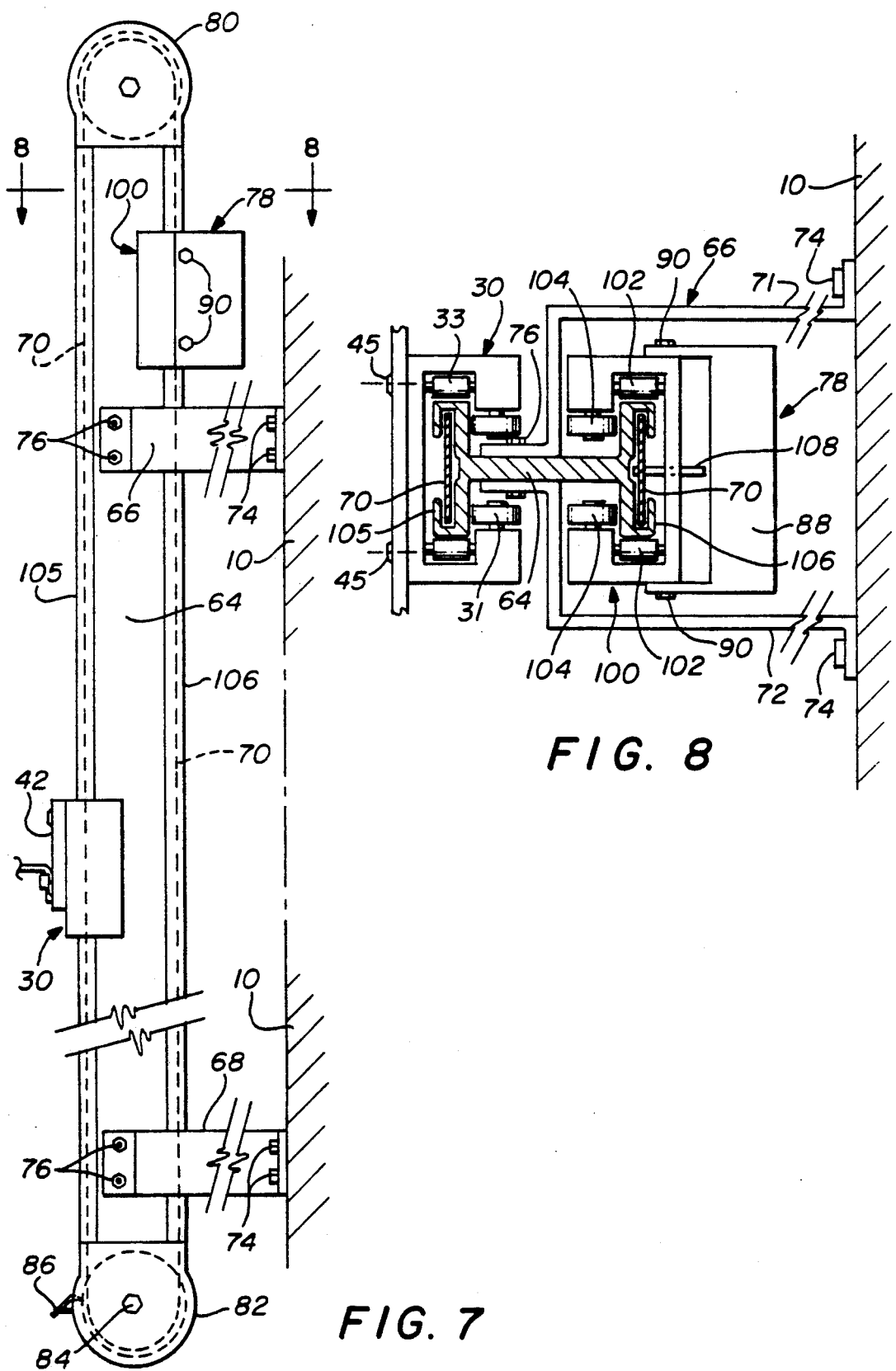
FIG. 7 is a side view of a manually operated mount and track assembly.
FIG. 8 is a cross-sectional view taken along lines 8—8 of FIG. 7.

FIGS. 7 and 8 illustrate an alternate embodiment of the present device which is manually operated. FIG. 7 is a side view of the device and FIG. 8 is a cross-sectional view of the device taken along lines 8-8 of FIG. 7. As can be seen in FIG. 7, track 64 has mount 30 slidably attached thereto as described previously in relation to FIGS. 4 and 5. On the backside of track 64 is a counterweight 78 that is also slidably mounted on track 64. A first sprocket 80 at the top and a second sprocket 82 at the bottom of the track allow the band to be continuous and reverse in direction of travel. An orifice 84 in the bottom sprocket 82 is adapted to receive a mechanical arm or crank in a well-known manner such that the bottom sprocket 82 can be manually rotated to cause band 70 to move upwardly or downwardly as desired to manually raise mount 30 with a bicycle or other object attached thereto. Because counterweight 78 is approximately the weight of the bicycle or other object attached to mount 30, it requires very little effort on the part of the user to raise or lower mount 30 and the object attached thereto by rotating the lower sprocket 82. A ratchet lock 86 operates in a conventional manner to allow the load to be moved upwardly but prevents the load on mount 30 from moving the band 70 downwardly until the ratchet 86 is released. It will be noted in FIG. 7 that the track 64 is mounted to wall 10 by the use of brackets 66 and 68.

As can be seen more clearly in FIG. 8, the mounting brackets 66 and 68 are U-shaped having arms 71 and 72 that attach to the wall at one end by means of bolts 74 and at the other end to the track 64 by means of bolts 76. This construction allows the counterweight 78 to move upwardly and downwardly on the track 64 between the arms 71 and 72. In a manner similar to mount 30, the counterweight 78 has a weight 88 attached by means 90 to a frame 100. Frame 100 has bearings 102 on the front and 104 on the back to allow it to move freely up and down the channel 106 which contains the band 70. Thus, track 64, when used with the embodiment shown in FIGS. 7 and 8, has a front channel 105 and a rear channel 106. The front channel 105 allows the movement of the band 70 upwardly over sprocket 80 down through rear channel 106 to the lower sprocket 82 and back to the front channel as a continuous band. A pin 108 extends through the forward portion of mount 100 and into an opening or orifice in the band 70 to couple mount 100 to the band 70. This pin 108 may be similar to that disclosed in FIG. 6 for use with forward mount 30 if desired. Otherwise, it may simply be a pin that can be inserted through mount 100 into an opening of band 70.

Thus, there has been disclosed a novel mobile mount system in which a bicycle or other object can be moved upwardly along a vertical wall and/or horizontally across the ceiling wall as desired to remove the bicycle or other object out of the way of traffic. The novel system is so designed that the mount that carries the bicycle or other object can be detachably coupled to the band which carries the mount such that a first bicycle or object can be moved to the top of the track and the mount disconnected from the moveable band and a second bicycle or object be placed on a second mount and moved upwardly adjacent the first one. Thus, a more efficient use of space is achieved. In addition, a manually operated version allows the use of a counterweight so that very little manual force is required to move a bicycle or other object up or down the track to which the mount is attached.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A. mobile mount system comprising:
   an elongated track attached to a wall;
   an endless weight carrying band associated with the track;
   a mount detachably coupled to the band for receiving an object, the mount being movably coupled to the track; and
   power means engaging the band for enabling selective movement of an object placed on the mount to a position where the mount can be detached from the band and the object left in the position where it will not interfere with other objects when not in use.

2. A system as in claim 1 wherein said elongated track further comprises:
   at least one channel in said track;
   an endless loop band being disposed in said channel for movement along said track; and
   a base extending therefrom for attaching the track to said wall.

3. A system as in claim 2 wherein said object is a bicycle.

4. A system as in claim 3 wherein said means engaging said band is a drive motor.

5. A system as in claim 3 wherein said object mount comprises:
   a frame having at least one opening therein surrounding said track with the base of said track located in the open portion of the frame;
   bearings mounted on said frame for contact with the track for slidable movement of the frame along the track; and
   an object receiving rack attached to the frame for holding the object during movement thereof.

6. A system as in claim 5 further comprising:
   a plurality of spaced orifices in said band;
   a latch pivotally coupled to the frame; and
   a projection on said latch extending into one of said orifices such that movement of the band moves the latch, the U-shaped frame, the object receiving rack and the object.

7. A system as in claim 6 wherein the object receiving rack comprises:
   an elongated rectangular plate attached to said frame;
   at least two spaced arms for receiving said bicycle;
   an opening in the elongated rectangular plate;
   said latch being pivotally mounted on the elongated rectangular plate with the projection thereon extending through said opening into an orifice in said band such that movement of the band moves the object receiving rack; and resilient means urging said projection in connection with an orifice in said band.

8. A system as in claim 1 further comprising:

a first object receiving mount detachably coupled to said band such that when the object is move to the noninterfering position, the object receiving mount can be disconnected from the track and the first object left with the mount in the noninterfering position when said band moves; and a second object receiving mount detachably coupled to said band such that a second object can be placed on the second mount and moved to a noninterfering position without disturbing the first object.

9. A system as in claim 3 wherein said means engaging said band comprises a counterweight coupled to said band such that the counterweight offsets the weight of the object receiving mount and the object so as to enable manual lowering and raising of said object with minimal effort.

10. A system as in claim 9 further comprising:

a first sprocket at one end of said track for engaging the orifices in said endless loop band;

a second sprocket at the other end of said track for engaging the orifices in said endless loop band; and means in one of said sprockets for receiving a manually operated crank that can rotate said one of said sprockets to move said object up or down as desired.

* * * * *